(12) United States Patent  (10) Patent No.: US 7,475,738 B2
Frasier  (45) Date of Patent: Jan. 13, 2009

(54) DISK ASSEMBLY FOR AN AGRICULTURAL IMPLEMENT

(75) Inventor: Michael E. Frasier, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/241,711

(22) Filed: Sep. 30, 2005

(65) Prior Publication Data

US 2007/0074879 A1    Apr. 5, 2007

(51) Int. Cl.
  A01B 15/16    (2006.01)
  A01B 23/06    (2006.01)
  A01B 71/04    (2006.01)

(52) U.S. Cl. .................. 172/604; 172/518; 172/681; 111/140

(58) Field of Classification Search .................. 111/140, 111/163, 167, 192; 172/518, 604, 681
See application file for complete search history.

(56) References Cited

U.S. PATENT DOCUMENTS

| 1,781,219 A | * | 11/1930 | Delaval-Crow | 384/542 |
| 1,956,236 A | * | 4/1934 | Hughes | 384/513 |
| 2,136,155 A | * | 11/1938 | Spicacci | 384/539 |
| 2,274,438 A | * | 2/1942 | Stoner | 172/603 |
| 2,560,965 A | * | 7/1951 | Lewis | 384/157 |
| 2,610,897 A | * | 9/1952 | Rebmann | 301/5.7 |
| 2,698,565 A | * | 1/1955 | Carney | 172/574 |
| 3,397,933 A | * | 8/1968 | Hatcher | 384/460 |
| 4,760,806 A | * | 8/1988 | Bigbee et al. | 111/167 |
| 4,796,550 A | * | 1/1989 | Van Natta et al. | 111/135 |
| 5,494,339 A | * | 2/1996 | Johnson et al. | 301/105.1 |
| 5,588,382 A | * | 12/1996 | Embree et al. | 111/139 |
| 5,639,166 A | * | 6/1997 | Dittenhofer | 384/461 |
| 5,802,995 A | * | 9/1998 | Baugher et al. | 111/52 |

* cited by examiner

*Primary Examiner*—Thomas B Will
*Assistant Examiner*—Joel F Mitchell
(74) *Attorney, Agent, or Firm*—Taylor & Aust, P.C.

(57) ABSTRACT

A disk assembly for an agricultural implement includes a hub; a disk mounted to the hub; an axle having outer threads; a sleeve having inner threads engaged with the outer threads on the axle; and a bearing assembly having an outer race adjacent the hub and an inner race adjacent the sleeve.

19 Claims, 2 Drawing Sheets

Figure 1:
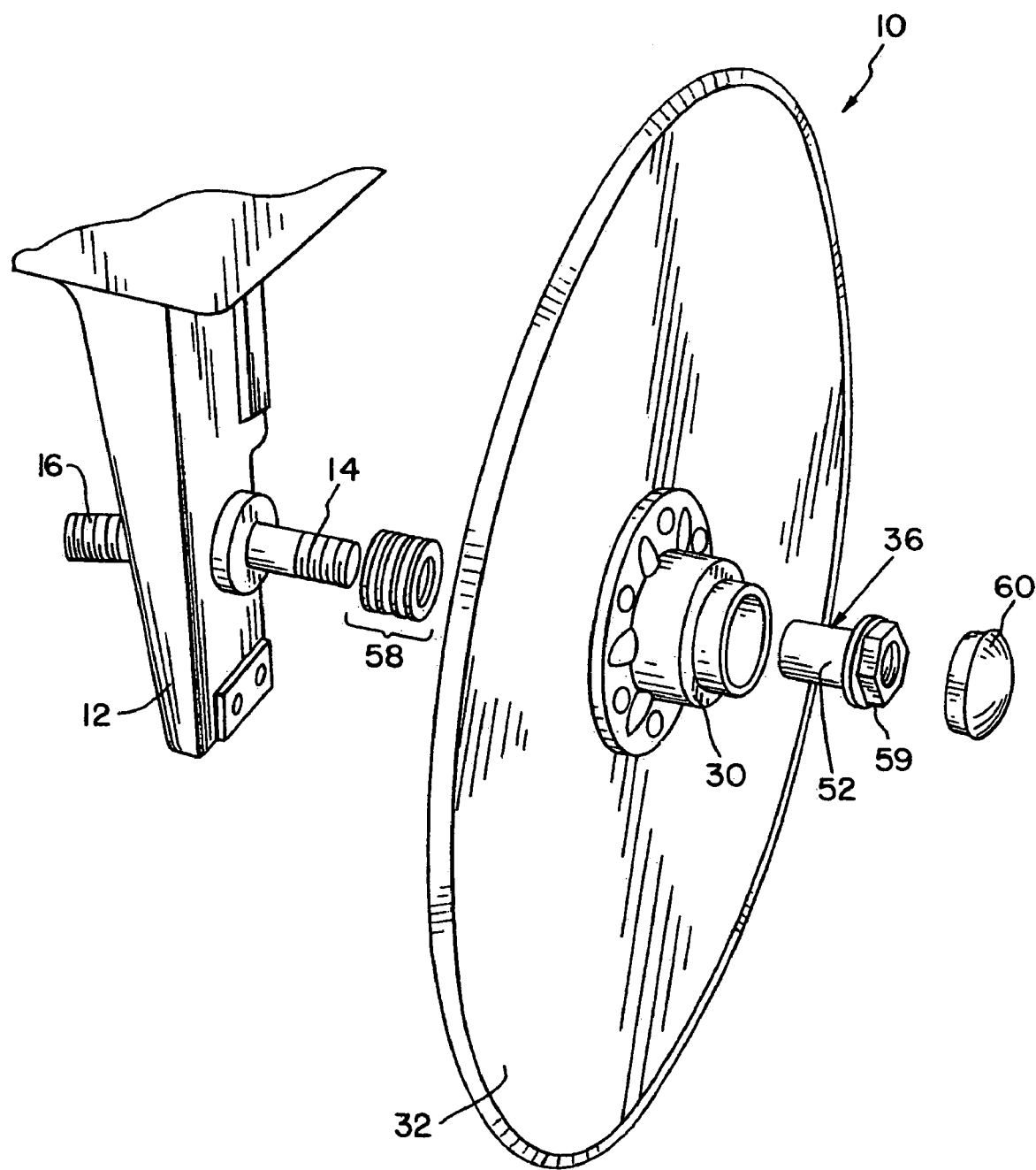
Figure 2:
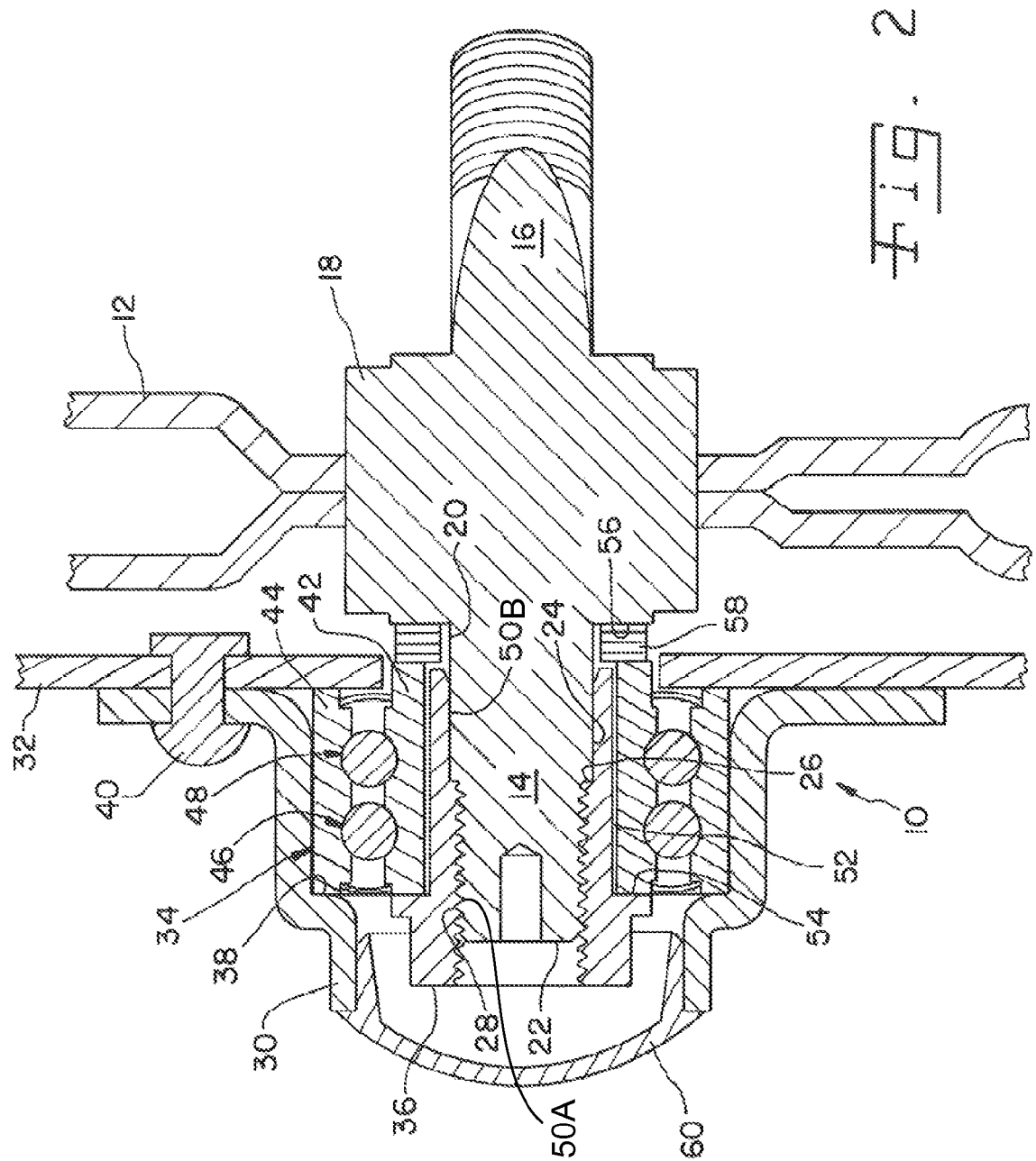

DISK ASSEMBLY FOR AN AGRICULTURAL IMPLEMENT

FIELD OF THE INVENTION

The present invention relates to disk assemblies for agricultural implements, and, more particularly, to mounting configurations for such disk assemblies.

BACKGROUND OF THE INVENTION

Disk blades are used on agricultural implements to cut slot shaped openings in the soil. For example, a disk assembly may be used as a disk opener on a seeding machine in the form of row crop unit. The frame of the row crop unit rigidly carries an axle to which the disk assembly is mounted. A hub carries the disk, and is mounted to the axle by an intervening ball bearing assembly. The ball bearing assembly typically is in the form of a single row of ball bearings positioned between an inner race and outer race.

The tendency for agricultural seeding machines has been toward no-till planting practices and higher ground speeds. Both no-till practices and higher ground speeds increase the mechanical loading on the bearing assembly of the disk opener to a point which decreases the operational life of the bearing assembly. Since the bearing assembly is usually sold as an assembly with the hub and disk, replacing the bearing assembly also means replacing the hub and disk which is expensive.

What is needed in the art is a disk assembly having a bearing assembly with improved operational life, reduced mechanical loading, and the ability to retrofit to existing row crop units.

SUMMARY OF THE INVENTION

The present invention provides a disk assembly for an agricultural implement, including a sleeve which acts as an adapter to couple a disk assembly having a two row ball bearing assembly with an axle configured to directly carry a single row ball bearing assembly.

The invention comprises, in one form thereof, a disk assembly for an agricultural implement, including a hub; a disk mounted to the hub; an axle having outer threads; a sleeve having inner threads engaged with the outer threads on the axle; and a bearing assembly having an outer race adjacent the hub and an inner race adjacent the sleeve.

The invention comprises, in another form thereof, a method of installing a disk assembly on an agricultural implement, including the steps of: positioning a hub, disk and bearing assembly over an axle; inserting a sleeve between the axle and the bearing assembly; engaging inner threads on the sleeve with outer threads on the axle; and constraining the hub, disk and bearing assembly on the axle using a shoulder on the sleeve.

BRIEF DESCRIPTION OF THE DRAWINGS

FIG. 1 is an exploded view of an embodiment of a disk assembly of the present invention, in relation to a portion of a frame of an agricultural implement; and FIG. 2 is a sectional view of the disk assembly of FIG. 1, when mounted to the axle and frame.

DETAILED DESCRIPTION OF THE INVENTION

Referring now to the drawings, there is shown an embodiment of a disk assembly 10 of the present invention for use with an agricultural implement. In the embodiment shown, the agricultural implement is in the form of a row crop planter including a frame 12 for carrying disk assembly 10. Disk assembly 10 may be used as a disk opener for opening a seed trench in which seeds are deposited. The configuration and operation of such a row crop planter is conventional, and is not described further.

An axle 14 is welded to frame 12 and carries disk assembly 10. In the embodiment shown, axle 14 and a second axle 16 are each integrally formed with a center hub 18, which in turn is welded to frame 12 around the periphery thereof. Axle 14 carries a first disk opener and axle 16 carries a second disk opener in the event a double disk opener is used. Of course in the event a single disk opener is used, second axle 16 may not be present. For purposes of discussion, only axle 14 will be described hereinafter, it being understood that axle 16 is similarly configured.

Axle 14 includes a base end 20 and an opposite outer end 22. Axle 14 includes a non-threaded outer surface 24 adjacent to base end 20, limited at the distal side away from base end 20 with a stepped shoulder 26. Axle 14 includes outer threads 28 extending between stepped shoulder 26 and outer end 22.

Disk assembly 10 generally includes a hub 30, disk 32, bearing assembly 34 and sleeve 36. Hub 30, disk 32 and bearing assembly 34 are assembled together. More particularly, bearing assembly 34 is constrained between shoulder 38 of hub 30 and disk 32. Rivets 40 are used to couple hub 30 with disk 32, thereby carrying bearing assembly 34 therebetween.

When used with a conventional disk assembly, the disk assembly includes a hub, disk and single row ball bearing assembly. The inner race of the ball bearing assembly lies directly against non-threaded outer surface 24 of shaft 14, and the outer race of the bearing assembly lies against the hub which carries the disk. A separate nut is threaded onto outer threads 28 of axle 14 and lies adjacent the inner race of the single row ball bearing assembly to hold the ball bearing assembly in place against center hub 18. The length of the single row ball bearing assembly generally corresponds to the length of non-threaded outer surface 24 of axle 14.

In contrast, bearing assembly 34 includes an inner race 42, outer race 44, first concentric row of ball bearings 46, and second concentric row of ball bearings 48. By using two rows of ball bearings 46, 48 rather than a single row of ball bearings as in conventional designs, the load distribution can be decreased, further increasing the operational life of bearing assembly 34 and disk assembly 10. However, as is also apparent from FIG. 2, the axial length of bearing assembly 34 is greater than the axial length of non-threaded outer surface 24, thus not allowing two row ball bearing assembly 34 to be mounted directly on non-threaded outer surface 24.

Inner race 42 of bearing assembly 34 has an inside diameter which is greater than the outside diameter of non-threaded outer surface 24. Sleeve 36 is interposed between bearing assembly 34 and shaft 14, and acts as an adapter to allow the double row ball bearings of bearing assembly 34 to be carried by conventional axle 14. More particularly, sleeve 36 includes inner threads 50A which engage with outer threads 28 on axle 14. For threaded engagement between sleeve 36 and axle 14, the outboard end of sleeve 36 is configured with a drive nut 59 for rotation using an air gun, wrench or the like. Sleeve 36 includes a non-threaded inner surface 50B which extends substantially the length of inner race 42 and lies closely adjacent non-threaded outer surface 24 of axle 14. Sleeve 36 also includes an outer surface 52 which directly carries inner race 42 of bearing assembly 34. A shoulder 54 extending from outer surface 52 constrains an axial end of inner race 42. The opposite axial end of inner race 42 is constrained using shoulder 56 extending from axle 14, with or without one or more intervening shims 58. A dust cap 60 is pressed into the outer end of hub 30, and prevents entry of foreign matter into bearing assembly 34.

To install disk assembly 10, the old disk assembly which may include a single row ball bearing assembly is removed from axle 14. If needed, one or more shims 58 are placed over axle 14 and against shoulder 56 prior to positioning bearing assembly 34 over axle 14. Bearing assembly 34, carried by hub 30 and disk 32, is positioned over axle 14 and held in place while sleeve 36 is slid into position between axle 14 and inner race 42 of bearing assembly 34. Sleeve 36 can only be slid in an axial direction until inner threads 50A meet with outer threads 28 on axle 14. At that point, drive nut 59 is rotated to threadingly couple sleeve 36 with axle 14, thereby in turn causing translational movement of sleeve 36 toward shoulder 56. Dust cap 60 is pressed into place within hub 30 to prevent dust from entering disk assembly 10, particularly bearing assembly 34.

Having described the preferred embodiment, it will become apparent that various modifications can be made without departing from the scope of the invention as defined in the accompanying claims.

The invention claimed is:

1. A disk assembly for an agricultural implement, comprising:
   a hub;
   a disk mounted to said hub;
   an axle having outer threads;
   a sleeve having inner threads engaged with said outer threads on said axle, said sleeve having a non-threaded inner surface that extends over a portion of said axle; and
   a bearing assembly having an outer race adjacent said hub and an inner race adjacent said sleeve, said sleeve substantially extending between said axle and said inner race, said outer threads engaging said inner threads at least partially radially inwardly from said inner race, said non-threaded inner surface of said sleeve being between a portion of said inner race and said axle.

2. The disk assembly of claim 1, wherein said axle includes a base end and an outer end opposite said base end, said outer threads being adjacent said outer end.

3. The disk assembly of claim 2, wherein said axle includes a non-threaded outer surface adjacent said base end.

4. The disk assembly of claim 3, wherein said axle includes a stepped shoulder between said non-threaded outer surface and said outer threads.

5. The disk assembly of claim 1, wherein said sleeve includes a drive nut.

6. The disk assembly of claim 1, wherein said axle includes a first shoulder and said sleeve includes a second shoulder, said bearing assembly being constrained between said first shoulder and said second shoulder.

7. The disk assembly of claim 6, wherein said bearing assembly is also constrained between said hub and said disk.

8. The disk assembly of claim 6, further including at least one shim between said first shoulder and said bearing assembly.

9. The disk assembly of claim 1, wherein said bearing assembly includes two rows of ball bearings between said inner race and said outer race.

10. The disk assembly of claim 1, wherein said disk assembly comprises a disk opener assembly on an agricultural seeding machine.

11. An agricultural implement, comprising:
    a frame member;
    a disk assembly carried by said frame member, said disk assembly including:
    a hub;
    a disk mounted to said hub;
    an axle having outer threads;
    a sleeve having inner threads engaged with said outer threads on said axle, said sleeve having a non-threaded inner surface that extends over a portion of said axle; and
    a bearing assembly having an outer race adjacent said hub and an inner race adjacent said sleeve, said sleeve substantially extending between said axle and said inner race, said outer threads engaging said inner threads at least partially radially inwardly from said inner race, said non-threaded inner surface of said sleeve being between a portion of said inner race and said axle.

12. The agricultural implement of claim 11, wherein said axle includes a base end and an outer end opposite said base end, said outer threads being adjacent said outer end.

13. The agricultural implement of claim 12, wherein said axle includes a non-threaded outer surface adjacent said base end.

14. The agricultural implement of claim 11, wherein said sleeve includes a drive nut.

15. The agricultural implement of claim 11, wherein said axle includes a first shoulder and said sleeve includes a second shoulder, said bearing assembly being constrained between said first shoulder and said second shoulder.

16. A method of installing a disk assembly on an agricultural implement, comprising the steps of:
    positioning a hub, a disk and a bearing assembly over an axle;
    inserting a sleeve between said axle and said bearing assembly;
    engaging inner threads on said sleeve with outer threads on said axle at least some of said inner threads engaging said outer threads radially inwardly from said bearing assembly, said sleeve including a non-threaded inner surface positioned radially between said axle and said bearing assembly; and
    constraining said hub, said disk and said bearing assembly on said axle using a shoulder on said sleeve.

17. The method of installing a disk assembly of claim 16, wherein said sleeve includes a drive nut, and said engaging step includes rotatably driving said sleeve using said drive nut.

18. The method of installing a disk assembly of claim 16, wherein said sleeve includes an outer surface, and said shoulder extends from said outer surface.

19. The method of installing a disk assembly of claim 16, wherein said axle includes a base end, and including the step of installing at least one shim at said base end, prior to said positioning step.

* * * * *